US011257089B2

(12) United States Patent
Eller et al.

(10) Patent No.: US 11,257,089 B2
(45) Date of Patent: Feb. 22, 2022

(54) CRYPTOGRAPHIC TAINT TRACKING

(71) Applicant: DMG Blockchain Solutions Inc., Vancouver (CA)

(72) Inventors: Timothy Eller, Millbrae, CA (US); Patrick De La Garza, Sunnyvale, CA (US); Daniel Klein, Mountain View, CA (US); George Kellerman, Sunnyvale, CA (US); Steven Eliscu, Foster City, CA (US); Danny Yang, Santa Clara, CA (US)

(73) Assignee: DMG BLOCKCHAIN SOLUTIONS INC., Vancouver (CA)

( * ) Notice: Subject to any disclaimer, the term of this patent is extended or adjusted under 35 U.S.C. 154(b) by 0 days.

(21) Appl. No.: 16/699,061

(22) Filed: Nov. 28, 2019

(65) Prior Publication Data

US 2020/0167791 A1 May 28, 2020

Related U.S. Application Data

(60) Provisional application No. 62/772,602, filed on Nov. 28, 2018, provisional application No. 62/773,810, filed on Nov. 30, 2018.

(51) Int. Cl.
 *G06Q 20/40* (2012.01)
 *G06Q 20/36* (2012.01)

(52) U.S. Cl.
 CPC ....... *G06Q 20/4016* (2013.01); *G06Q 20/367* (2013.01)

(58) Field of Classification Search
 CPC .................................................. G06Q 20/4016
 See application file for complete search history.

(56) References Cited

U.S. PATENT DOCUMENTS

| 2017/0178139 | A1* | 6/2017 | Gieseke | G06Q 20/4016 |
| 2018/0018669 | A1* | 1/2018 | Goldberg | G06F 16/2228 |
| 2019/0378049 | A1* | 12/2019 | Widmann | G06N 3/0472 |

FOREIGN PATENT DOCUMENTS

WO WO-2020149790 A1 * 7/2020 ............ H04L 9/32

OTHER PUBLICATIONS

"Yin et al., A First Estimation of the Proportion of Cybercriminal Entities in the Bitcoin Ecosystem using Supervised Machine Learning, 2017, IEEE, entire document" (Year: 2017).*

* cited by examiner

*Primary Examiner* — Hani M Kazimi
*Assistant Examiner* — Adam Hilmantel
(74) *Attorney, Agent, or Firm* — Perkins Coie LLP; Colin Fowler

(57) ABSTRACT

A method for detecting and tracking tainted cryptographic wallets. The method measures a wallet's propensity to engage in criminal or suspicious activity. Naturally, transacting with a criminal is tantamount either to funding crime or laundering its proceeds, so it is in our collective interest to identify—and then monitor or quarantine—any wallet with criminal association. The method also automatically flags risky withdrawal requests in real-time for further review before committing them to the blockchain. In some embodiments, the exchange can quarantine wallets at a certain Walletscore.

3 Claims, 4 Drawing Sheets

CRYPTOGRAPHIC TAINT TRACKING

CROSS-REFERENCE TO RELATED APPLICATIONS

This application is a continuation of U.S. patent application Ser. Nos. 62/772,602, filed Nov. 28, 2018, and 62/773,810, filed Nov. 30, 2018 which are incorporated by reference herein in their entirety.

TECHNICAL FIELD

The disclosure relates to identifying cryptographic wallets involved in criminal activity.

BACKGROUND

Cryptocurrencies such as Bitcoin and Ethereum operate on distributed consensus networks that are recorded by blockchain data structures. A blockchain is an immutable, append-only public ledger. A benefit of such a data structure is that is reliable, secure, and open. However, one of the benefits, specifically the anonymity of transaction has attracted criminals to the platform.

DETAILED DESCRIPTION

Figure 1:
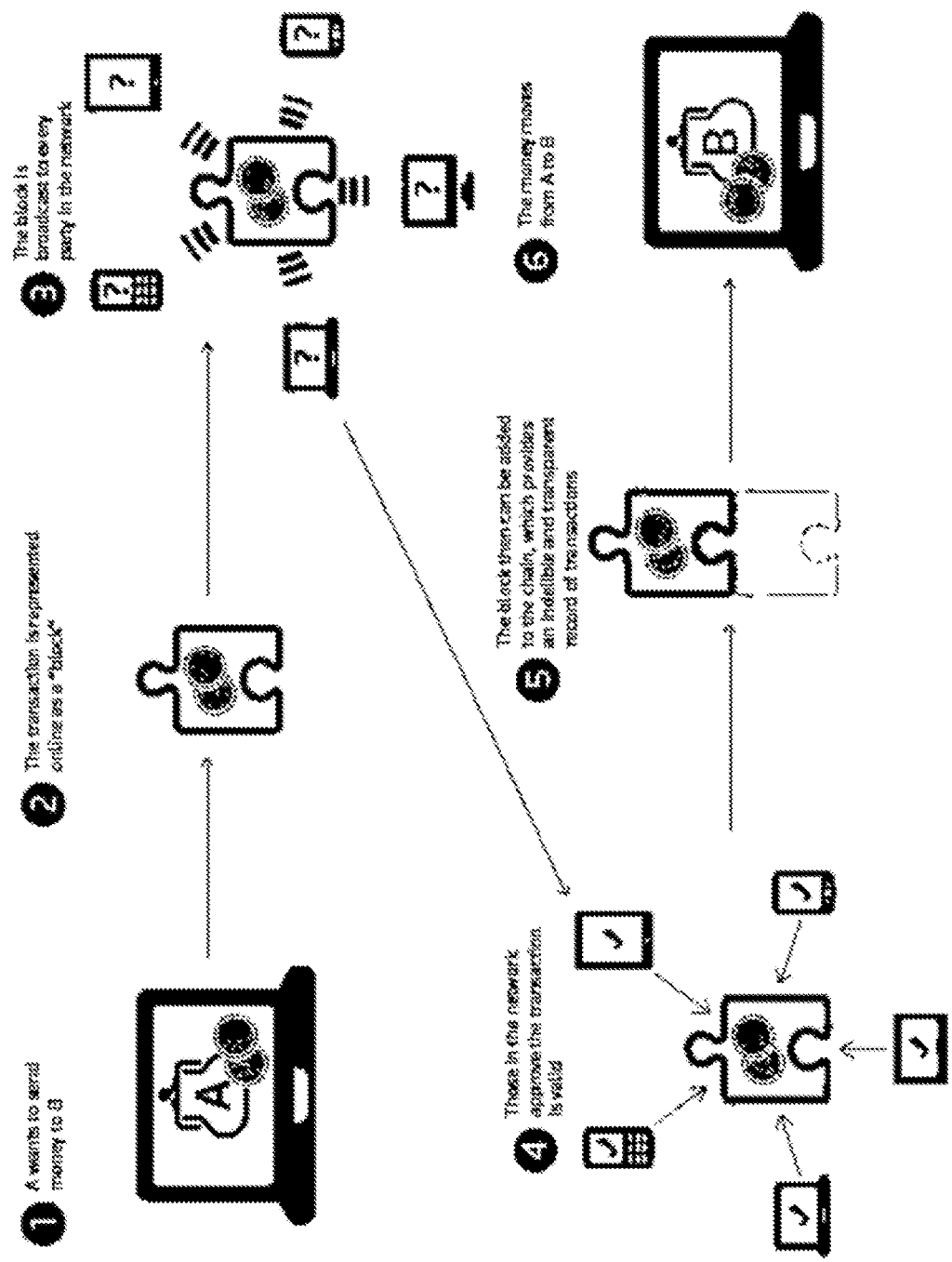
FIG. 1 is a block diagram of a blockchain data structure. Cryptocurrency networks operate on a distributed network architecture.

The emergence of Cryptocurrency as a deregulated currency has posed problems for regulatory bodies such as the United States Government. In some circumstances, it behooves users to cooperate with regulatory bodies. In those circumstances, the distributed nature of the cryptographic coins impedes the ability to comply. Thus, there is a need to implement a cryptographic coin that retains many of the benefits of the distributed system but includes data structures that enable compliance with regulatory agencies and serve as a security.

Walletscore measures a wallet's propensity to engage in criminal or suspicious activity. Naturally, transacting with a criminal is tantamount either to funding crime or laundering its proceeds, so it is in our collective interest to identify—and then monitor or quarantine—any wallet with criminal association.

The most popular use of Walletscore is by compliant exchanges, payment platforms and OTC traders who wish to understand their existing and potential customers better. But it is also used by individuals who recognize that their own reputations are influenced by those with whom they transact.

To vet an existing customer, an exchange (for example) would run Walletscore against the wallets that have sent funds to the customer's deposit address(es), as well as those to which the customer has withdrawn money. By automating this procedure across its customer base, the exchange can then form a priority list for further investigation. It can also automatically flag risky withdrawal requests in real-time for further review before committing them to the blockchain. In some embodiments, the exchange can quarantine wallets at a certain Walletscore. Quarantined wallets may be either within the exchange or outside. Where the wallet is inside the exchange, and the exchange has control over the wallet, the wallet is prevented from transacting. Where the wallet is outside of the exchange, the exchange refuses to transact with the wallet. Using score propagation, "taint" can chain from one wallet outside of the exchange to another thereby causing any given endpoint's walletscore to be sufficient for determining whether to quarantine the wallet.

Terminology

An entity is any person or company, or merely a reference to either, that owns the private keys to an address. Examples are: Mrs. Jones, Binance Exchange, 2016 Bitfinex Thief.

NOTE: To be sure, even though a customer of an exchange is given a deposit address, the address is truly owned by the exchange rather than by the customer, since the exchange controls the private keys to that address.

Each entity belongs to one of a definitive set of categories, such as exchange, gambling site, scammer or mixer.

A category may be assigned a degree of criminality, which we call its risk score. (For instance, the dark market category deserves a high-risk score, whereas a law enforcement agency gets a risk score of 0, and private individuals are not given any risk score.) The term "risk" can be interpreted as a proxy for the legal risk one takes by transacting with an entity from a given category. An entity belonging to a category that has a risk score is said to carry some intrinsic risk. Otherwise, it derives extrinsic risk from nearby entities having intrinsic risk.

We define a wallet as the set of addresses belonging to a single entity (or set of entities, to accommodate multisig addresses). In some instances, we deliberately arrange for an entity to have multiple wallets, as in the case of an exchange that stores some value in "cold" storage wallets, and some in "hot" storage. In a similar fashion to entities, wallets have either intrinsic or extrinsic risk.

Although we can reasonably partition addresses into wallets, we are often unable to identify the entities that own them. But sometimes we can at least identify the category of the (unknown) entity that owns it. In these cases, our clues about the wallet's category often come from topological properties about its transactions. For example, to the extent we suspect that a given transaction exemplifies mixing, we can then further speculate that the input and output addresses belong to a mixer.

Properly, "criminality" is property of categories, but this notion extends to entities and wallets by this diagram (which does not represent multisig wallets):

wallet [∃ entity] ∃ category ∃ risk score

Accordingly, a wallet's criminal association is based on the criminality of the category of the entity that owns the wallet.

Finally, we define hops among entities (or wallets). Two entities are one hop from each other precisely when there exists a single transaction between them. This forms a directed graph of entities. We say that entities that are n hops away from one another if the shortest path connecting them (ignoring direction) has n edges.

A wallet's transactional neighborhood is the set of wallets that have transacted with the given wallet, plus those that have transacted with its transactors, and so on. While there is no strict limit to the number of hops that constitute the neighborhood, we intuitively mean it's less than the entire network of wallets, and more than just itself.

FIG. 1 is a block diagram of a blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult. While it is true that many nodes often group together in pools that together work together to solve for nounces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

At the time of this filing, Bitcoin blocks are limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Gaps in verification time introduces the issue within the Bitcoin network at a given moment of "who has the money." During the 10 to 15-minute span between block generation transactions that have been submitted may not actually process. This would occur when a user spends money they didn't have, or double spends. This is not to say the network has no verification mechanism between blocks. For example, when a given user attempts to pay another user, the system may easily query older blocks to inspect the given user's balance as of at least the most recently published block. If the given user has sufficient funds, it is moderately safe to trust the transaction.

However, if the given user is attempting to double spend all their money, only one of those transactions will publish in the next block. The other will be rejected (which is rejected, and which processes is subject of a race condition and not necessarily dependent on time of generation). When discussing trivial amounts of money (e.g., paying for coffee), this is not really a big concern. However, when handling larger purchases that occur quickly (e.g. stock in a company), the amounts can become significantly greater, and a clearance time of 10-15 minutes is not ideal.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain.

Figure 2:
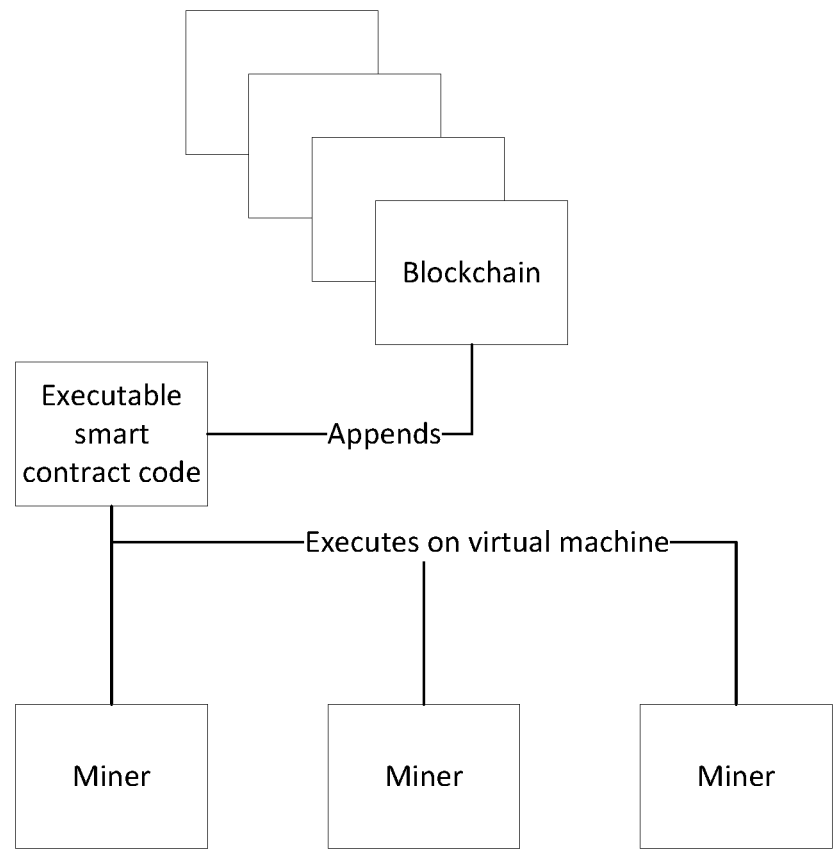
FIG. 2 is a block diagram illustrating a data structure of a smart contract.

FIG. 2 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Etheruem coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. for example, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from the Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise the cost of execution may spiral out of control. Unrestricted, an exponential function may bankrupt a given user.

While operations in the Ethereum virtual machine (EVM) have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Thus far discussion has been focused around Bitcoin and Ethereum. As applicable in this disclosure, these are base cryptocurrencies. Other base cryptocurrencies exist now and in the future. This disclosure is not limited to application on specifically the Bitcoin or Ethereum blockchains.

A custom cryptographic token as described in this disclosure (hereafter, "custom token") described herein shares many of the characteristics of both fungible (ERC-20) and non-fungible tokens (ERC-721). Custom tokens may be designed to represent complete or fractional ownership interests in assets and/or entities. While utility tokens have no limitations on who can send or receive the token, custom tokens are subject to many restrictions based on identity, jurisdiction and asset category.

The concept of utility tokens is understood in the blockchain space today. Utility tokens represent access to a network, and a give utility token purchase represents the ability to buy goods or services from that network—for example, an arcade token allows users to play an arcade game machine. Utility tokens give users that same type of access to a product or service. On the other hand, custom tokens represent complete or fractional ownership in an asset (such as shares in a company, a real-estate asset, artwork, etc). Owning a stake in a company, real estate, or intellectual property can all be represented by custom tokens. Custom tokens offer the benefit of bringing significant transparency over traditional paper shares through the use of the blockchain and its associated public ledger. Custom token structure, distribution, or changes that could affect investors are now accessible to all via the blockchain.

Figure 3:
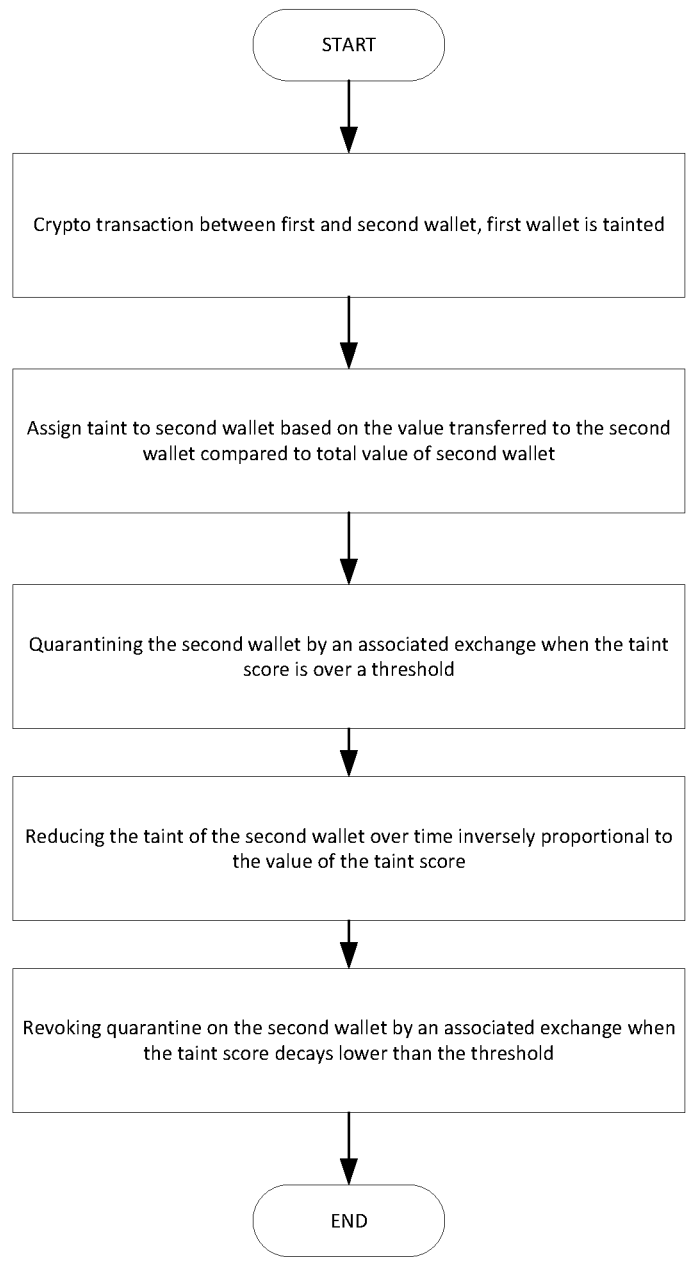
FIG. 3 is a block diagram of various cryptographic addresses and entities included within the data structure of the custom token.

FIG. 3 illustrates identification of a risk score.

Risk Score Philosophy

There are several nuances to defining an interpretable and useful risk score. In particular, we want to satisfy these constraints:

Permit the intrinsic risk score of a given wallet to affect the risk score of another wallet—having no intrinsic risk score—to which it connected by multiple hops.

Arrange so that the intrinsic risk score of a given wallet does not diminish over time and hops, yet diminishes immediately upon seizure by law enforcement.

Accommodate varying views of what constitutes criminal versus suspicious activity, as in the case of gambling.

Accommodate varying degrees of evidence of criminal activity, from direct to circumstantial to hearsay. Evidence comes from numerous channels include direct reports from the entity themselves. Each channel is given a confidence score. Self-reporting or reports by law enforcement are treated as trusted sources.

Arrange so that a wallet's risk score is proportional to criminal intent, as in the case of a scam victim who unwittingly sends funds to a scammer, or someone who receives an iota of heist proceeds through an airdrop—neither of which should suffer an increase in risk score.

Arrange so that a wallet's risk score reflects the proportion of funds exchanged with wallets carrying some amount of intrinsic risk, perhaps as well as the volume thereof.

Risk Score

We define the risk score of a wallet (without intrinsic risk) as the proportion of funds it has received from or sent to, possibly indirectly, nearby wallets with intrinsic risk. It takes values from 0 to 1, with 0 denoting "negligible risk" (since evidently none of the given wallet's in/outflow is traceable to a wallet with known criminal association) and 1 denoting "high risk" (since evidently all of the given wallet's in/outflow is traceable to wallets with known criminal association).

Note: It is a fallacy to conclude that the funds passed to or from our specified wallet are directly related to criminal activity. That said, receiving funds from a criminally-associated wallet is a form of money laundering, and sending funds to such a wallet is a form of funding crime—even if inadvertent or unwitting.

The system computes the influence of every wallet on every other wallet by looking at the proportional provenance and destination of funds flowing through each wallet. Influence of each wallet on each other is similar to the function of page-rank for search engines on the Internet, but for the propagation of crypto coins. The system can then use vectorized "influences" for any number of things, including but not limited to the propagation of risk, flow of taint, or influence of a particular actor on the network. our primary application at the moment is to try to quantify the legal/reputational risk of associating with a particular wallet.

In some embodiments, taint is passed on the basis of how tainted a given wallet is and how much of the content of the wallet is transacted. When taint is said to be "passed" the original wallet does not lose taint. Taint is conserved. A limited set of actions, or non-actions reduce taint. For example, reported seizure by law enforcement may remove taint from a wallet. Taint may be removed over time. The rate upon which taint is lost may be proportional to the current level of taint. For example, a wallet that is 1% tainted may lose that taint over a period of time (perhaps a year), while a wallet that is 100% tainted may require well over the lifespan of the average human to become untainted.

EXAMPLES

Here are some hypothetical examples that convey the intuition, before we present the mathematics.

A given wallet directly received the proceeds of a heist. The direct knowledge of its criminality automatically gives it an intrinsic risk score of 1, obviating the need to inspect its transactional neighborhood.

100% of a given wallet's incoming funds are traceable to a wallet that directly received proceeds of a heist. It is given an extrinsic risk score of 1, derived from its relationship with the heist.

A reputable exchange harbors a deposit address that has directly received all the proceeds of a heist. If the exchange immediately quarantines that wallet so that there is no topological connection between the deposit address and its own wallet, its own extrinsic risk score will not be elevated. But if the exchange absorbs the heist proceeds and treats the value no differently from any other incoming value, it is now complicit in money laundering, and its wallet's extrinsic risk score will be related to the fraction of all funds ever coming into the exchange that came from the heist.

Where 1% of the income of a wallet comes from a 100% tainted wallet. The receiving wallet becomes 1% tainted.

Where 50% of the coin content of a 70% tainted wallet transacts, 35% taint is passed (70% of 50% is 35%).

5% of the value ever sent from a given private wallet was paid to a dark market in a well-documented transaction that conveys criminal intent. It is given an extrinsic risk score of 0.05, the proportion of its total funds sent that were intended for criminal activity.

5% of the value ever to leave a given private wallet was paid to a ransom address. Its extrinsic risk score is arguably 0, since we're reluctant to hold victims accountable. (Other interpretations might assign some risk to the wallet, because it facilitated the crime.).

Implementation

So far in our discussion, we have presupposed that we know first of all which addresses are grouped into which wallets, and furthermore which wallets fall into which categories—the remaining wallets' scores being calculated with respect to nearby wallets carrying some intrinsic risk.

In fact, identifying which addresses belong to which wallets, discovering which of those are intrinsically risky, formulaically propagating a risky wallet's influence on its transactional neighborhood, and then scaling this process, is a monumental endeavor. It involves manual research, sophisticated modeling, and carefully crafted mathematics.

The amalgamation of these efforts is a model that maps each address (rather than wallet) to a risk score. We factor this into three projects:

Curation:

(1) Manually curate a set of address-entity associations—a record of addresses known to belong to particular entities.

(2) Manually map each entity to a category, resulting in a set of address-category associations.

(3) Assign each category an optional risk score, resulting in particular addresses being endowed with some level of intrinsic risk.

Classification: Cluster addresses into wallets and extend the curated address-entity/category/risk associations to those wallets.

Risk Propagation. Devise a formula that proportionately propagates risk from wallets with quantified risk to all wallets.

From a modeling point of view, the first two projects constitute a supervised classification algorithm that categorizes a large swath (but far from all) of blockchain addresses. As such, its quality is measured by withholding a fraction of the curated associations up front, and then evaluating the classification applied to the withheld set.

NOTE: Our refactoring is far from the only approach. For instance, we could reasonably regard the entire endeavor as a (supervised learning) binary classification model of criminality, in which we first identify a set of known criminal and non-criminal addresses, engineer several features that describe the space of addresses, and then use those features to concoct a model that successfully predicts the criminality of the known examples. However, in our experience, there is so much richness in various topological heuristics (e.g. "shared inputs" clustering) that dismissing our topological clustering approach would cripple our success; we cannot foresee any advantage of a strictly supervised approach at this point.

Below, we give details about how we implement each of these projects (which are ongoing, in parallel).

Curation:

We gather address-entity associations through a variety of methods:

Manually perform transactions with known entities (e.g. exchanges, gambling sites, and mixers).

Purchase data sets from, and entering data-sharing agreements with, trusted parties.

Crawl sources of structured and unstructured labeled data.

Engage in sleuthing on the dark web (e.g. via Tor).

Transcribe published reports from news media and social media.

Ingest data shared by Blockseer users.

Our most recent effort entails outsourcing data collection and cleaning globally.

Each method and source is assigned a confidence level, so that we can resolve conflicts (such as when an address is given conflicting labels).

From our raw sources, we derive a canonical set of several hundred entities, corrected for misspellings, alternate spellings, and historical changes of hands. Then, each of those entities is assigned a category, chosen from a canonical set of roughly thirty categories. Each category is assigned a (configurable) risk score between 0 and 1—or none at all.

Classification

The Classification project has two ultimate outputs: a partition of the full set of addresses into wallets, and a mapping from a subset of those wallets to entities/categories/risk levels.

NOTE: To be sure, for the sake of risk scoring, it is not necessary to map each address to an entity. but rather only to a category—or even only to a risk level. That said, the most efficient way of identifying the category of an address is typically to identify its entity, which then implies a category and then a risk level. Sometimes, however, as in the case of the mixer category, it's easier to identify the category than the entity. That is, the transaction topology suggests the addresses belong to a mixer, but we might not know—or care—which mixer.

Our Approach Has Two Main Steps:

Semi-supervised Address Classification: Group addresses together based on compelling topological heuristics, and then classify these groups by extending each address-entity/category/risk association to the other addresses in its group.

Supervised Transaction Classification: Transforming to transaction space—by assigning each transaction the class of its input addresses, use supervised classification to map a larger set of transactions to entities, and then transform back to address space—by assigning each address the class(es) of the transactions emanating from it.

Below, we describe each step in further detail.

Semi-Supervised Address Classification

The semi-supervised classification of addresses generally takes advantage of the "shared inputs" heuristic—grouping addresses that are inputs into the same transaction—and then applying the curated associations to these clusters.

NOTE: There are exceptions to this heuristic: A notable exception is the case of a heist, in which a stolen address gets cleaved from other addresses with which it has been a shared input into a transaction. Another exception comes from an early practice by some exchanges of permitting customers to upload their own addresses, rather than for the exchange to provide a deposit address. This resulted in the customers' addresses mingling with other addresses in the exchange, rendering the shared inputs heuristic irrelevant.

After forming groups of addresses using topological heuristics, we extend each address-entity association to the rest of its group.

Occasionally this leads to conflicts, say, in which one group contains two addresses thought to belong to different entities. This is resolved either by manually cleaving the group into smaller pieces, or by allowing the highest-confidence label take precedence.

Supervised Transaction Classification

Up to this point, we have applied the curated associations to address clusters in order to classify a decent subset of all addresses. However, the fact that several clusters end up in the same class, and many others are left unclassified, suggests that this clustering is perhaps too fine; a subsequent coarser clustering will gather more of those clusters into their appropriate classes.

Our second step is thus to extend the classification to an even larger set, this time by analyzing patterns within and between transactions. Indeed, institutional entities (e.g. mixers and exchanges) generate distinctive transactions, and it's reasonable that "clumps" of transactions that look similar might belong to the same entity.

NOTE: We opt to use supervised clustering since such algorithms generally output a vector of probabilities of class inclusion; this is useful in producing a risk score that has the interpretation as the probability that a wallet is risky. (Of course, one might have also gained this property by using an unsupervised fuzzy clustering algorithm.)

To scale this type of reasoning, we approach this as a supervised classification problem on the set of transactions. In particular, we define features that describe transactions and their topological neighborhoods (embedded in a sufficiently high-dimensional vector space), and then use any of the conventional classification algorithms to produce a mapping from transactions to entities or categories.

Examples of intra-transactional features are:
number and ratio of transaction inputs and outputs
transaction value scale and precision
change address likelihood
fee size and percentage
input and output value distribution To suss out inter-transactional topological features, we follow a new approach that takes random walks through the transaction graph, and then embeds these paths in a sufficiently high-dimensional vector space. The intuition is that paths emanating from different transactions in the same class should land near one another. Assigning a transaction the same class as any of its input addresses puts us in a position to employ any number of supervised classifications algorithms.

After classifying the full set of transactions, we then transform back to address space, applying a transaction class to its input addresses. Again faced with instances of conflict (e.g. when an address is part of two transactions that land in different classes for whatever reason), we either manually intervene, or default to the highest confidence class.

Finally, the quality of a mapping is then measured by a suitable multi-class generalization of any of the usual classification metrics: accuracy, precision and recall, ROC AUC, F1 score, etc.

Risk Propagation

The Risk Propagation project assigns risk to each wallet, given a directed graph of wallets in which: each edge is labeled by the aggregate transaction value from one wallet to another; each node is labeled by its flow—the aggregate sum of its sent and received values over time, as well as its intrinsic risk score (possibly null).

Conveniently, the Classification project delivers the directed graph with nodes labeled by risk, and it is a routine calculation to add the other labels.

Given this graph, risk is propagated according to two proportional flow matrices per wallet, calculated from the data above. The outflow matrix $F_O$ records the fraction of $W_A$'s flow that was sent to $W_B$. The inflow matrix $F_I$ records the fraction of $W_A$'s flow that came from $W_B$. Interpretation: in the case that $W_B$ is intrinsically risky, the first matrix approximates $W_A$'s culpability for funding B's criminal activity, and the second matrix approximates $W_A$'s culpability for laundering $W_B$'s dirty funds.

Naturally, risk can propagate beyond immediate neighbors, and to those neighbors' neighbors. Raising either proportional flow matrix to the nth power calculates the fraction of funds that went to (or came from) a given wallet's n-hop neighbors. Altogether, a wallet's risk is propagated to its 1-hop neighbors, its 2-hop neighbors, and so on. The full distribution of risk—in either direction—is therefore the sum of these inbound and outbound propagations:

$$F = \sum_{n=0}^{\infty} F_I^n + \sum_{n=0}^{\infty} F_O^n = (I - F_I)^{-1} + (I - F_O)^{-1}$$

Finally, this total flow matrix is multiplied by the vector of each node's intrinsic risk (replacing null values with 0), to yield all other nodes' extrinsic risks:

$F \cdot v_R$.

Figure 4:
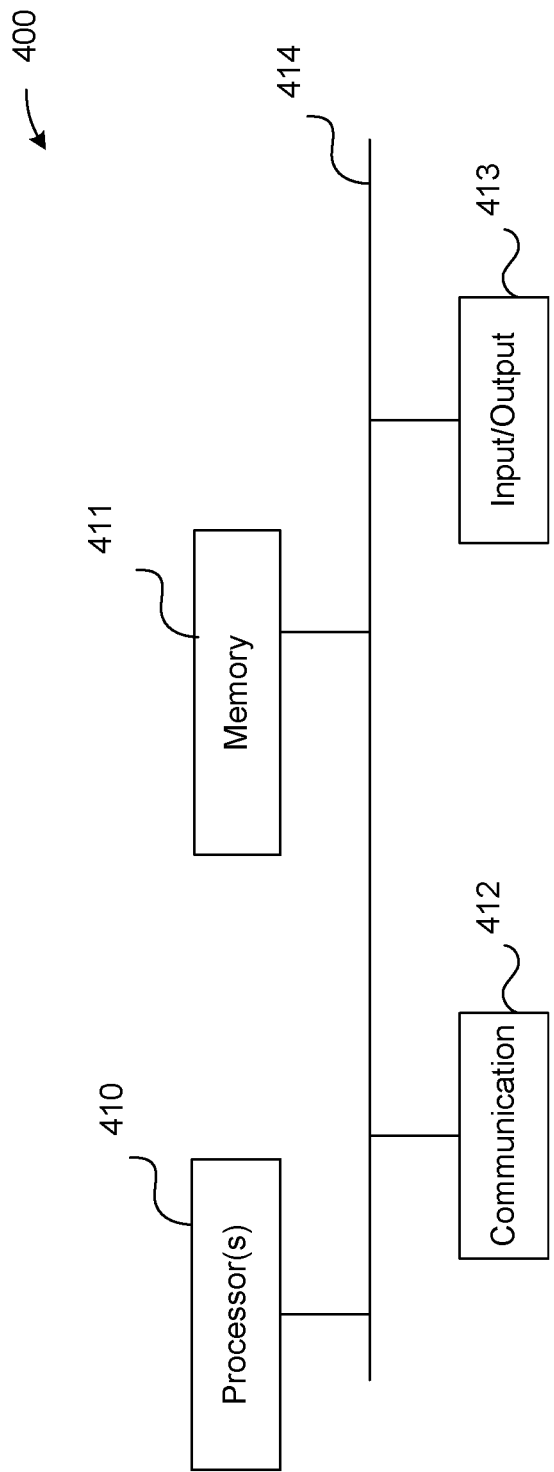
FIG. 4 is a block diagram of an exemplary computing system.

FIG. 4 is a high-level block diagram showing an example of a processing device 400 that can represent a system to run any of the methods/algorithms described above. A system may include two or more processing devices such as represented in FIG. 4, which may be coupled to each other via a network or multiple networks. A network can be referred to as a communication network.

In the illustrated embodiment, the processing device 400 includes one or more processors 410, memory 411, a communication device 412, and one or more input/output (I/O) devices 413, all coupled to each other through an interconnect 414. The interconnect 414 may be or include one or more conductive traces, buses, point-to-point connections, controllers, scanners, adapters and/or other conventional connection devices. Each processor 410 may be or include, for example, one or more general-purpose programmable microprocessors or microprocessor cores, microcontrollers, application specific integrated circuits (ASICs), programmable gate arrays, or the like, or a combination of such devices. The processor(s) 410 control the overall operation of the processing device 400. Memory 411 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 411 may store data and instructions that configure the processor(s) 410 to execute operations in accordance with the techniques described above. The communication device 412 may be or include, for example, an Ethernet adapter, cable modem, Wi-Fi adapter, cellular transceiver, Bluetooth transceiver, or the like, or a combination thereof. Depending on the specific nature and purpose of the processing device 400, the I/O devices 413 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of identifying tainted cryptographic wallets comprising:
   identifying a cryptographic transaction between a first wallet and a second wallet on an anonymous blockchain data structure open for public inspection, wherein the first wallet has a first taint score, the cryptographic transaction having a first amount of cryptocurrency;
   determining a total value in cryptocurrency of the second wallet;
   assigning a second taint score to the second wallet, wherein the second taint score is a fraction of the first taint score based on a relative comparison between the first amount of cryptocurrency of the cryptographic transaction and the total value in cryptocurrency of the second wallet
   in response to the second taint score being above a threshold, quarantining, by a cryptographic wallet management exchange associated with the second wallet, the second wallet;
   reducing the second taint score of the second wallet over time at a rate inversely proportional to the second taint score; and
   in response to reducing the second taint score below the threshold, removing from quarantine, by the cryptographic wallet management exchange associated with the second wallet, the second wallet.

2. A method of identifying tainted cryptographic wallets comprising:
   identifying a cryptographic transaction between a first wallet and a second wallet on an anonymous blockchain data structure open for public inspection, wherein the second wallet has a first taint score, the cryptographic transaction having a first amount of cryptocurrency;
   determining a total value in cryptocurrency of the first wallet;
   assigning a second taint score to the first wallet, wherein the second taint score is either of:
   a fraction of the first taint score based on a relative comparison between the first amount of cryptocurrency of the cryptographic transaction and a total value in cryptocurrency of the first wallet in response to the first amount of cryptocurrency being greater than or equal to a threshold percentage of the total value in cryptocurrency of the first wallet; or or zero in response to the first amount of cryptocurrency being lower than the threshold percentage of the total value in cryptocurrency of the first wallet in response to the second taint score being above a threshold, quarantining, by a cryptographic wallet management exchange associated with the first wallet, the first wallet;

reducing the second taint score of the first wallet over time at a rate inversely proportional to the second taint score; and in response to reducing the second taint score below the threshold, removing from quarantine, by the cryptographic wallet management exchange associated with the first wallet, the first wallet.

3. A system of identifying tainted cryptographic wallets comprising:

a processor; and a memory including instructions that when executed cause the processor to:

identify a cryptographic transaction between a first wallet and a second wallet on an anonymous blockchain data structure open for public inspection, wherein the first wallet has a first taint score, the cryptographic transaction having a first amount of cryptocurrency;

determining a total value in cryptocurrency of the second wallet;

assign a second taint score to the second wallet, wherein the second taint score is a fraction of the first taint score based on a relative comparison between the first amount of cryptocurrency of the cryptographic transaction and the total value in cryptocurrency of the second wallet in response to the second taint score being above a threshold, quarantine, by a cryptographic wallet management exchange associated with the second wallet, the second wallet;

reduce the second taint score of the second wallet over time at a rate inversely proportional to the second taint score; and in response to reducing the second taint score below the threshold, remove from quarantine, by the cryptographic wallet management exchange associated with the second wallet, the second wallet.

* * * * *